US008770995B2

(12) United States Patent
Naito et al.

(10) Patent No.: US 8,770,995 B2
(45) Date of Patent: Jul. 8, 2014

(54) CARD CONNECTOR

(75) Inventors: Yuji Naito, Kanagawa (JP); Mitsuhiro Tomita, Kanagawa (JP); Yoko Takeuchi, Kanagawa (JP)

(73) Assignee: Molex Incorporated, Lisle, IL (US)

( * ) Notice: Subject to any disclaimer, the term of this patent is extended or adjusted under 35 U.S.C. 154(b) by 561 days.

(21) Appl. No.: 12/989,548

(22) PCT Filed: Apr. 23, 2009

(86) PCT No.: PCT/US2009/041478
§ 371 (c)(1),
(2), (4) Date: Jan. 7, 2011

(87) PCT Pub. No.: WO2009/146223
PCT Pub. Date: Dec. 3, 2009

(65) Prior Publication Data
US 2011/0124212 A1    May 26, 2011

(30) Foreign Application Priority Data

May 24, 2008    (JP) .................................. 2008-113879

(51) Int. Cl.
*H01R 13/44*    (2006.01)
(52) U.S. Cl.
USPC ......................................... 439/159; 439/630
(58) Field of Classification Search
USPC ......................................... 439/155–159, 630
See application file for complete search history.

(56) References Cited

U.S. PATENT DOCUMENTS

| 5,536,180 | A | * | 7/1996 | Ishida et al. ................... 439/159 |
| 6,146,163 | A | * | 11/2000 | Wu ................................ 439/159 |
| 6,382,995 | B1 |   | 5/2002 | Bricaud et al. |
| 6,802,726 | B2 |   | 10/2004 | Chang |
| 6,814,596 | B2 | * | 11/2004 | Yu et al. ......................... 439/159 |
| 6,875,057 | B2 | * | 4/2005 | Miyazawa et al. ............. 439/630 |
| 6,929,491 | B1 |   | 8/2005 | Chi-Te |
| 7,118,396 | B2 | * | 10/2006 | Ting ............................... 439/159 |
| 7,238,034 | B2 |   | 7/2007 | Yamane et al. |
| 7,393,221 | B2 |   | 7/2008 | Feng et al. |
| 2004/0266237 | A1 | * | 12/2004 | Kodera et al. .................. 439/159 |
| 2007/0178733 | A1 | * | 8/2007 | Sadatoku ...................... 439/159 |

FOREIGN PATENT DOCUMENTS

| CN | 2001001264159 | 8/2002 |
| JP | 2004-277900 | 1/2006 |
| JP | 3126609 U | 11/2006 |
| JP | 4489643 | 12/2006 |
| JP | 4671866 | 7/2007 |
| JP | 4586003 | 4/2008 |
| WO | PCT/EP1999/003450 | 12/1999 |
| WO | PCT/US2006/000190 | 7/2006 |

OTHER PUBLICATIONS

International Search Report and Written Opinion of PCT Patent Application No. PCT/US2008/0041478, dated Aug. 3, 2009.

* cited by examiner

*Primary Examiner* — Renee S Luebke
*Assistant Examiner* — Larisa Tsukerman
(74) *Attorney, Agent, or Firm* — Timothy M. Morella (57) ABSTRACT

A card connector comprises a housing, an auxiliary urging member and a card guide mechanism. The housing is provided with connection terminals connected to a card housed therein. The auxiliary urging member is capable of urging the card in a direction opposite to an insertion direction of the card. The card guide mechanism is provided with an urging member capable of urging the card in the direction opposite to the insertion direction of the card. The urging member and the auxiliary urging member are also configured to cooperate with each other to move the card.

20 Claims, 8 Drawing Sheets

Prior Art

FIG. 8

CARD CONNECTOR

BACKGROUND OF THE INVENTION

1. Field of the Invention

The present invention relates, generally, to a card connector, and, more particularly, to a card connector having an auxiliary urging member allowing it to be ejected in a reliable manner when pushed in the forward (or insertion) direction.

2. Description of the Related Art

Currently, electronic devices, such as personal computers, cellular telephones, personal digital assistants, digital/video cameras, music players, game machines or car navigation devices, are provided with a card connector for using a variety of memory cards. In order to facilitate ejection of a memory card from a conventional card connector, the conventional card connector is typically configured to incorporate a means such that the memory card may be discharged by using a spring force. An example is disclosed in PCT Patent Application No. PCT/EP1999/0003450.

Figure 8:
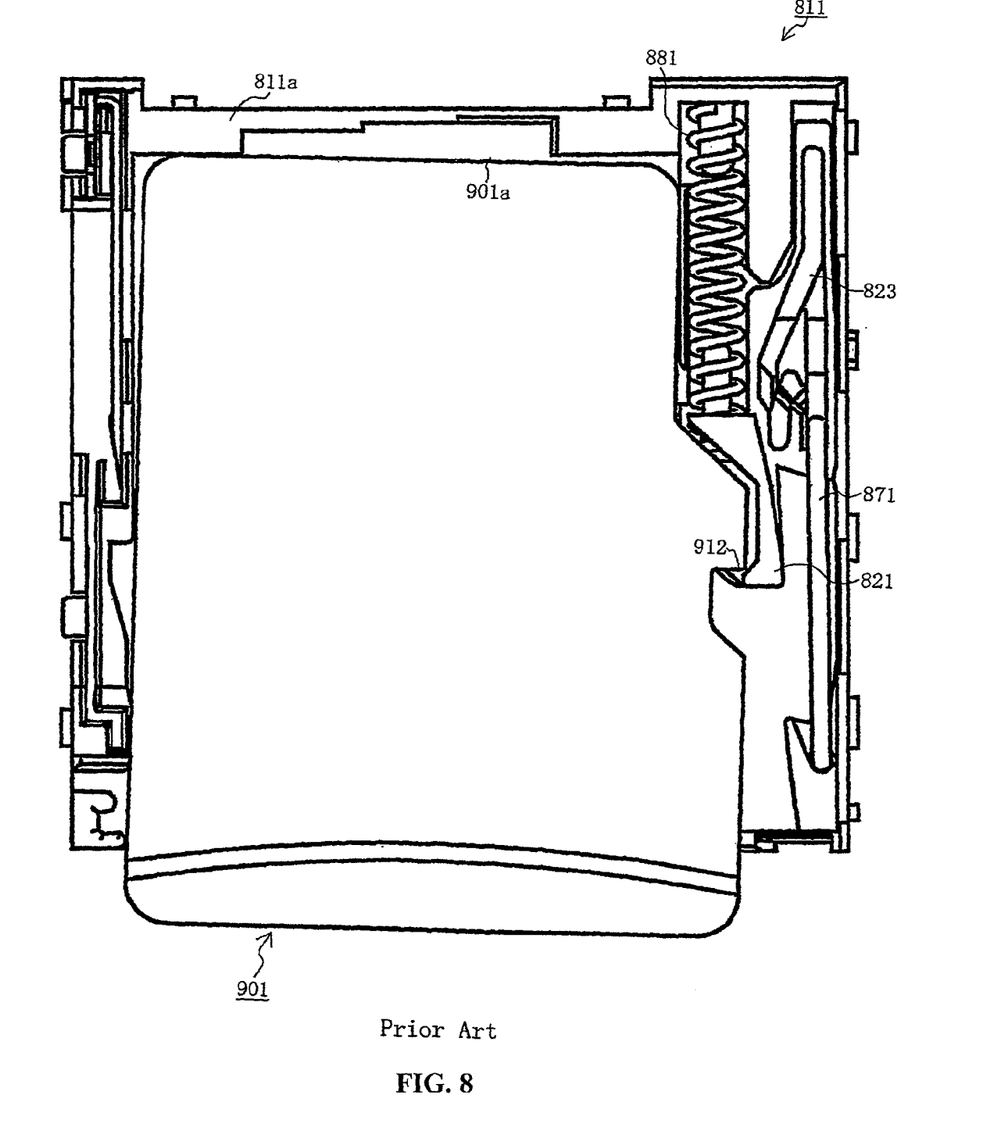
FIG. 8 is a view of a conventional card connector.

FIG. 8 illustrates a schematic plan view of a conventional card connector. As shown in FIG. 8, housing 811 is provided with slide member 821, slidably attached thereto so as to be urged in one direction by coil spring 881. In the illustrated example, the conventional card connector is a "push-push" type connector, in which cam groove 823 of a heart cam is formed in slide member 821, and a free end of pin member 871 is engaged into cam groove 823 with one end latched to housing 811.

When a user inserts (pushes) memory card 901 into housing 811, memory card 901 is pushed deep into an innermost side (the upper side in FIG. 8) of housing 811. Slide member 821 then comes into engagement with concave portion 912, formed in a portion of a lateral edge of memory card 901, and is moved toward the innermost side of housing 811, together with memory card 901, while resisting against a repulsive force of coil spring 881. Further, when the free end of pin member 871 is latched to cam groove 823 by the action of the heart cam, and when slide member 821 stops moving, memory card 901 is held stationary in the position where it is inserted into housing 811.

When a user ejects memory card 901 from housing 811, the free end of pin member 871 is released (from being latched to cam groove 823). With this operation, slide member 821 is set free and moved toward the front side (the lower side in FIG. 8), together with memory card 901, by the force exerted by coil spring 881. Thus, memory card 901 is discharged from housing 811. FIG. 8 illustrates a state immediately after the discharge operation of memory card 901 is started.

However, in the conventional card connector, when memory card 901 is ejected, it can get caught in housing 811 in spite of pushing by the user, and discharge of memory card 811 may result in failure. Additionally, in recent years, with the rapid miniaturization of electronic devices, memory cards and card connectors have also become miniaturized. For this reason, it is necessary to miniaturize coil spring 881. As a consequence, the force necessary for discharging memory card 901 must decrease.

In order to miniaturize housing 811, it is necessary that a slide mechanism, including coil spring 881 and slide member 821, be provided only at one side of housing 811. Hence, the discharge force acts on only one side of memory card 901 (via slide member 821). As a result, memory card 901 is displaced so that it is somewhat tilted, as illustrated in FIG. 8. Since a gap between front end 901a of memory card 901 and inner wall portion 811a of housing 811 differs from the left end to the right end, it can be understood that memory card 901 is displaced by the rotation thereof in the clockwise direction. As a result, a side surface of memory card 901 is pressed against a lateral wall of housing 811 opposite slide member 821. Further, by friction between the lateral wall and the side surface, the discharge of memory card 901 is prevented.

In addition, in recent years, memory card 901 often has a rough, rather than a smooth, surface. In such a case, the friction between the inner surface of housing 811 and the surface of memory card 901 might increase, as compared with the instance in which the memory card is not tilted. Thus, the discharge of memory card 901 can further be prevented.

Furthermore, since the contact pressure between a plurality of contact pads of memory card 901 and a plurality of connection terminals of the card connector cannot be effectively decreased (from the viewpoint of securing connection reliability), any decrease in the discharge force results in a main cause for preventing the discharge of memory card 901.

SUMMARY OF THE INVENTION

Therefore, it is an object of the Present Invention to solve the above-described disadvantages, encountered by the conventional card connector, and to provide a card connector which can be manufactured in a small size, at low cost and with simple structure. It is a further object of the card connector of the Present Invention to include an auxiliary urging member, capable of applying a force (which urges a card in a direction opposite to an insertion direction of the card when the card is moved further forward in the insertion direction from a lock position) is disposed at a position located further toward an inner side, when viewed in the insertion direction of the card, than a front end of the card held at the lock position thereof. Thus, a strong urging force can eventually be applied to the card in an initial stage of the card discharging operation. As a result, the card can be discharged in a reliable manner.

For this reason, a card connector according to an embodiment of the Present Invention includes a housing provided with connection terminals connected to a card housed therein; an auxiliary urging member capable of urging the card in a direction opposite an insertion direction of the card; and a card guide mechanism provided with an urging member capable of urging the card in the direction opposite the insertion direction, wherein the urging member and the auxiliary urging member are configured to cooperate with each other to move the card.

In the card connector according to another embodiment of the Present Invention, the card guide mechanism holds the card provided with terminal members at a lock position to maintain a state where the terminal members are in contact with the connection terminals of the housing, and moves the card in the direction opposite to the insertion direction, when the card reaches a given terminal point due to a push operation for pushing the card held at the lock position thereof to be moved in the insertion direction, from the terminal point by an urging force of the urging member so that the card is discharged. The auxiliary urging member is, moreover, disposed at a position located further toward the inner side in the insertion direction than the card held at the lock position so as to urge the card in the direction opposite to the insertion direction during a movement of the card in a region spanning from the terminal point to the lock position thereof.

In the card connector according to a further embodiment of the Present Invention, the card connector further includes a cover member attached to the housing so as to cover at least a portion of an upper portion of the housing and the card housed in the housing, and the auxiliary urging member is attached to the cover member.

In the card connector according to a further embodiment, the auxiliary urging member is configured to exert no urging force when the card is in a lock position.

In the card connector according to a further embodiment, the card guide mechanism is configured to come into engagement with one lateral end of the card to move the card, and the auxiliary urging member applies the urging force thereof to a portion in the vicinity of the other lateral end of the card.

In the card connector according to a further embodiment, the housing is provided with a bottom wall portion and an inner wall portion that upstands at an end at an inner side of the bottom wall portion, and the inner wall portion is provided with a concave receipt portion in which the auxiliary urging member is received.

In the card connector according to a further embodiment, the card connector further includes a card detection switch capable of detecting that the terminal members of the card are in contact with the connection terminals, and the card detection switch is provided with a first contact member that is moved while making a tight contact with the other lateral end of the card and a second contact member that is brought into electrical contact with the first contact member.

The card connector according to a further embodiment includes a housing in which a card provided with terminal members is accommodated; connection terminals that are attached to the housing and are capable of coming into contact with the terminal members of the card, and a card guide mechanism provided with an urging member capable of urging the card in a direction opposite to an insertion direction of the card, the card guide mechanism being configured to be capable of coming into engagement with one lateral end of the card to hold the card at a lock position thereof so as to maintain a state where the terminal members of the card are in contact with the connection terminals, and being further configured to be capable of moving the card in a direction opposite to the insertion direction, when the card reaches a terminal point due to a pushing operation for pushing the card held at the lock position in the insertion direction, from the terminal point by an urging force of the urging member so that the card is discharged. The card connector further includes an auxiliary urging member that is disposed at a position located further toward the inner side in the insertion direction than the card held at the lock position so as to urge the card in the direction opposite to the insertion direction during a movement of the card in a region spanning from the terminal point to the lock position thereof; and an elastic member that is disposed at an end at the front side in the insertion direction of the housing so as to elastically deform while making a tight contact with the other lateral end of the card.

In the card connector according to a further embodiment, the card connector further includes a cover member attached to the housing to cover at least a portion of an upper portion of the housing and the card housed in the housing, and the auxiliary urging member and the elastic member are attached to the cover member.

In the card connector according to a further embodiment of, the elastic member urges the card in a backward direction when it is moved toward a lateral side of the housing by the other lateral end of the card.

In accordance with the Present Invention, the card connector is provided with an auxiliary urging member capable of applying an urging force capable of urging an inserted card in the direction opposite to the insertion direction of the card when the card is moved further forward in the insertion direction from a lock position is disposed at a position located further toward the inner side in the insertion direction than a front end of the card at the lock position. With this arrangement, a strong urging force is applied to the card in an initial stage of the card discharging operation, and thus, the card can be surely discharged from the card connector in a reliable manner. Moreover, the card connector can be manufactured in a small size, at low cost and with simple structure.

BRIEF DESCRIPTION OF THE FIGURES

The organization and manner of the structure and operation of the Present Invention, together with further objects and advantages thereof, may best be understood by reference to the following Detailed Description, taken in connection with the accompanying Figures, wherein like reference numerals identify like elements, and in which.

DESCRIPTION OF THE PREFERRED EMBODIMENTS

While the Present Invention may be susceptible to embodiment in different forms, there is shown in the Figures, and will be described herein in detail, specific embodiments, with the understanding that the disclosure is to be considered an exemplification of the principles of the Present Invention, and is not intended to limit the Present Invention to that as illustrated.

In the embodiments illustrated in the Figures, representations of directions such as up, down, left, right, front, rear and the like, used for explaining the structure and movement of the various elements of the Present Invention, are not absolute, but relative. These representations are appropriate when the elements are in the position shown in the Figures. If the description of the position of the elements changes, however, it is assumed that these representations are to be changed accordingly.

Referring to FIGS. 1-4, card connector 1 is attached to an electronic device (not illustrated). Card 101 may be inserted into card connector 1 and coupled to the electronic device through card connector 1. Card connector 1 is preferably provided with housing 11, integrally formed of an insulating material, and shell 61, integrally formed by a conductive material and attached to the top of housing 11. Shell 61 is preferably configured to cover at least an upper portion of housing 11 and card 101 (which is accommodated within housing 11). Moreover, card connector 1 preferably has a generally flat rectangular parallel-piped shape, which is attached to the electronic device, and in which card 101 is inserted from a front side thereof.

Figure 1:
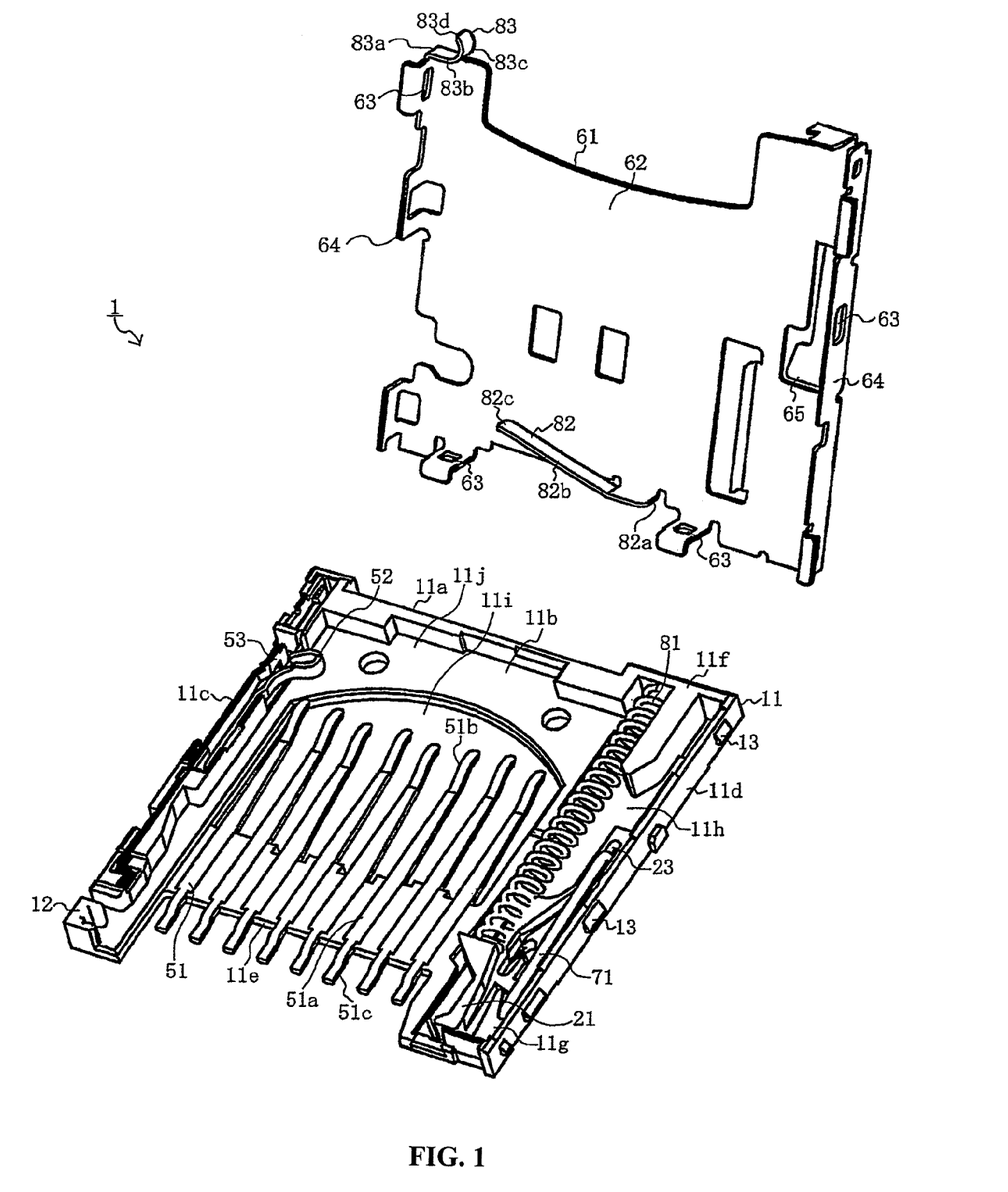
FIG. 1 is an exploded view of a card connector according to an embodiment of the Present Invention.
Figure 2:
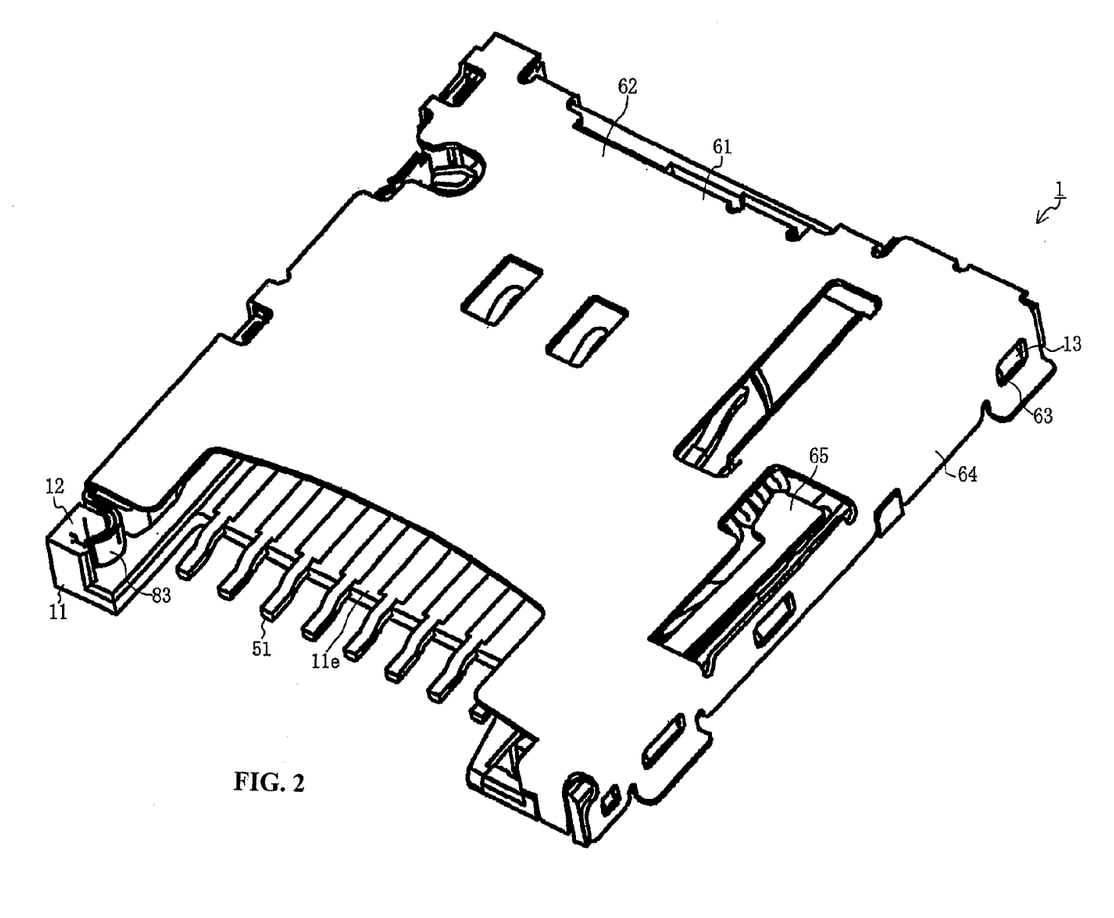
FIG. 2 is a first perspective view of the card connector according to an embodiment of the Present Invention.
Figure 3:
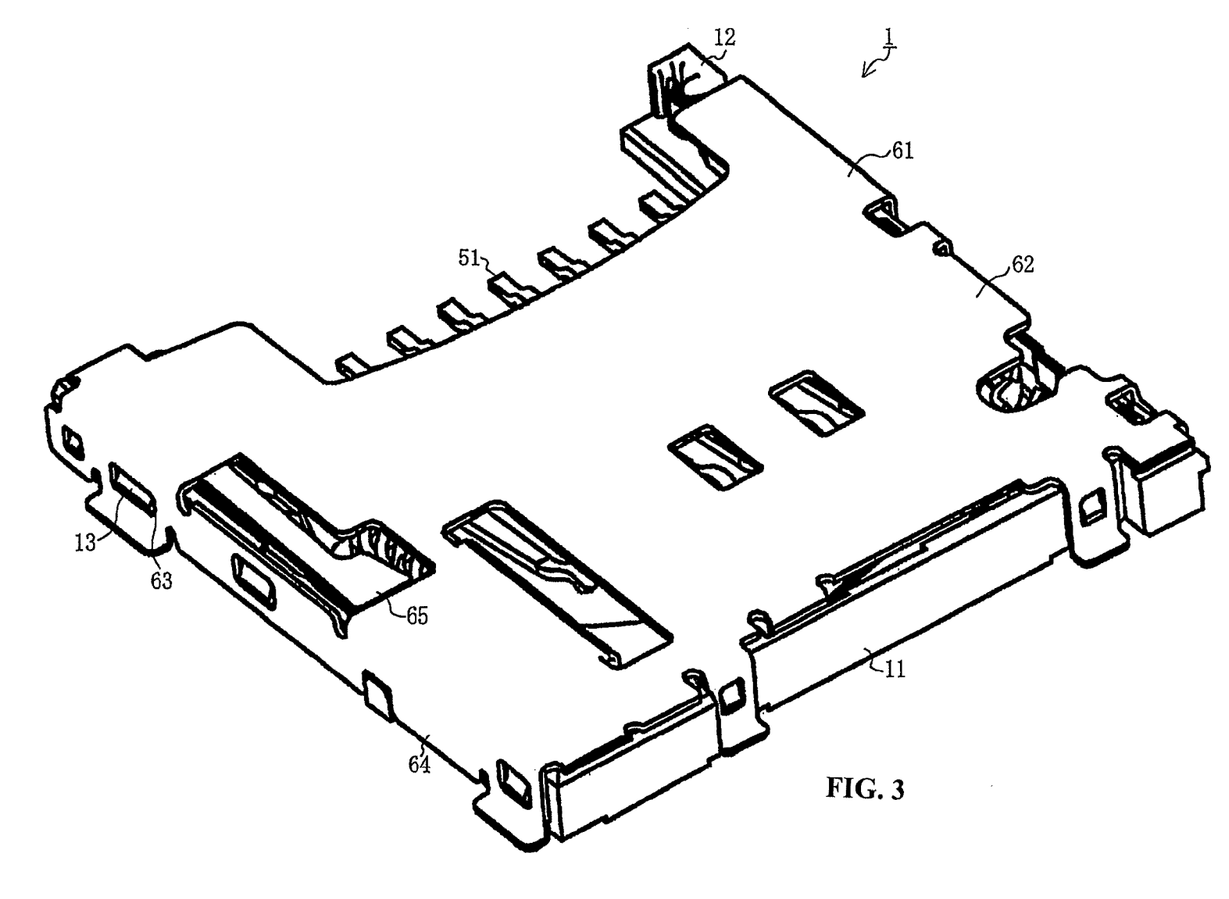
FIG. 3 is a second perspective view of the card connector according to an embodiment of the Present Invention.
Figure 4:
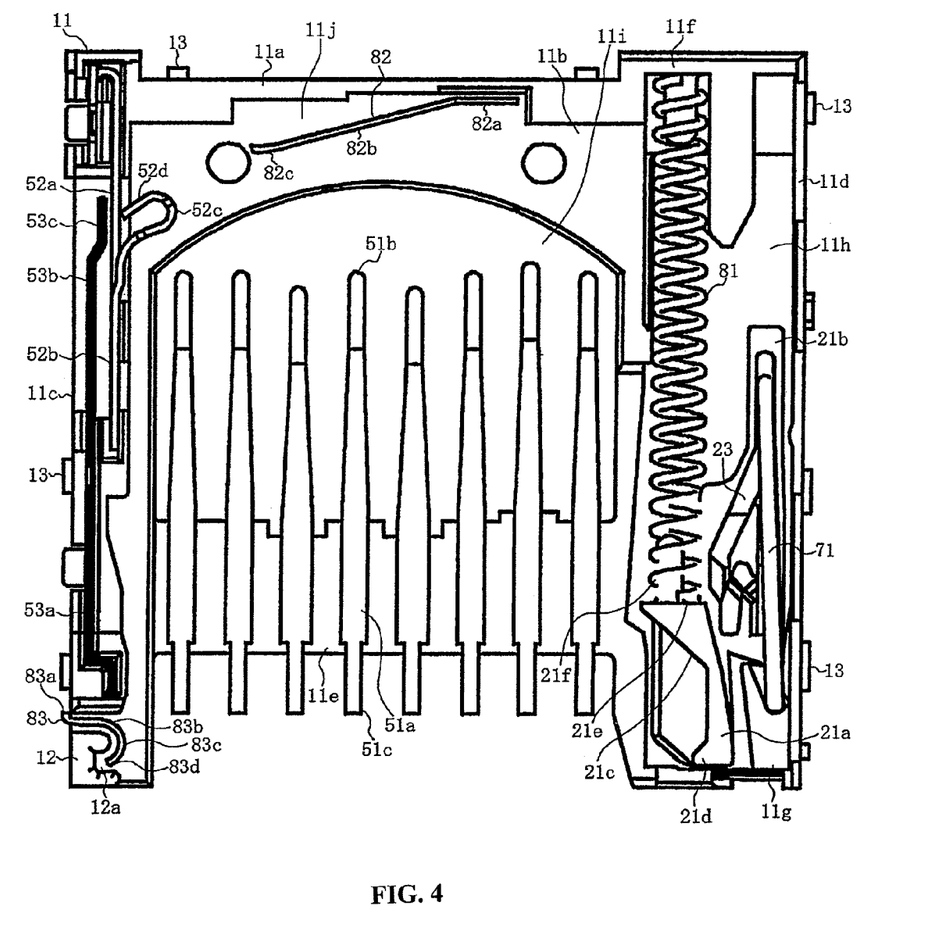
FIG. 4 is a plan view of the card connector according to an embodiment of the Present Invention, illustrating a state where a shell of the card connector is removed.

For the purpose of clarity, although FIG. 4 illustrates a plan view of housing 11 in which shell 61 has been removed, in order to illustrate the positional relationship, auxiliary urging member 82 and elastic member 83 are also illustrated. Housing 11 further is provided with bottom wall portion 11b, having such a shape that a front end portion thereof, serving as a front side in relation to an insertion direction of card 101, is excised into an approximately "U" or "C" shape, and inner wall portion 11a, which is erected from bottom wall portion 11b so as to extend along an edge at the deeper side of an inner portion thereof. Bottom wall portion 11b is preferably provided with terminal holding portion 11e to which plurality of terminals 51 are attached. On the upper surface of terminal holding portion 11e, a plurality of terminal fitting grooves are formed so as to extend in a front-rear direction, and terminals 51 as the connection terminal are inserted into the respective terminal fitting grooves.

Terminals 51 preferably include base portions 51a fitted into corresponding terminal fitting grooves, and distal end portions 51b extending obliquely upward toward inner wall portion 11a so as to be projected outward from the upper surface of bottom wall portion 11b. Distal end portions 51b are electrically coupled to a plurality of contact pads. Moreover, solder tail portions 51c, which extend from a root portion of terminals 51, are projected toward the front side, from the edge at the front side of bottom wall portion 11b, and electrically coupled to a plurality of signal lines, contact pads, terminals or the like formed on a wiring board of the electronic device (that is, to counterpart terminal members). Moreover, in a portion of bottom wall portion 11b, corresponding to a lower side of distal end portions 51b, opening portion 11i may preferably be formed so as to penetrate through bottom wall portion 11b.

Housing 11 further includes first lateral wall portion 11c (having an "L"-shaped cross section) extending in the front-rear direction along a lateral edge of bottom wall portion 11b; second lateral wall portion 11d extending in the front-rear direction along another lateral edge of bottom wall portion 11b; and insertion opening abutting portion 12 formed at the end of the front side of housing 11 (disposed further toward the front side than first lateral wall portion 11c).

Card guide mechanism holding portion 11h is preferably formed on an inner side of second lateral wall portion 11d. Slide member 21 of card guide mechanism, for guiding card 101 into card connector 1, is fitted to card guide mechanism holding portion 11h and freely slidable in the front-rear direction. Slide member 21 is configured to holding card 101 and slide cam portion 21b. Card holding portion 21a and slide cam portion 21b are preferably integrated with each other.

Further, card holding portion 21a is provided with first engagement portion 21c and second engagement portion 21d, each of which projects from a lateral surface thereof. First and second engagement portions 21c, 21d engage with engagement convex portion 111 and engagement concave portion 112, respectively, as engagement portions formed on the lateral surface of card 101. Moreover, slide member 21 moves in the front-rear direction together with card 101 when card 101 is held by first and second engagement portions 21c, 21d.

In addition, a lateral surface at a deeper side of card holding portion 21a functions as urging force receiving portion 21e, which receives urging member 81 formed of a coil spring. Latching projection 21f, which latches urging member 81, is formed in urging force receiving portion 21e. One end of urging member 81 is attached to latching projection 21f. The other end of urging member 81 is attached to latching portion 11f of inner wall portion 11a. Moreover, latching projections that latch latching portion 11f and urging member 81 are provided. With this arrangement, slide member 21 is urged in a direction opposite the insertion direction of card 101 (i.e., in a discharging direction of card 101) by urging member 81.

Card connector 1 is preferably a "push-in/push-out" (or "push-push") type connector. To this end, card connector 1 operates by pushing card 101 both when inserted into card connector 1 and when ejected from card connector 1. Such an operation is the same as an alternate action (a position retention or a "push-on/push-off" type) in the field of a push button switch. Slide cam portion 21b functions essentially as a cam mechanism of a heart-shaped cam for realizing the push-push type action. For this reason, cam groove 23 is formed in an upper surface of slide cam portion 21b, and a free end of elongated pin member 71 is engaged with cam groove 23. Further, the other end of pin member 71 is a fixed end, and is latched to an upper surface of stopper portion 11g formed at a front end of second lateral wall portion 11d so as to be pivotably coupled thereto. Moreover, by cooperation of pin member 71 and cam groove 23, slide member 21, which moves together with card 101, performs the push-push operation. In this arrangement, when card 101 is moved in the insertion direction to a termination point, by pushing card 101 again in the insertion direction, card guide mechanism moves card 101 in an opposite direction by an urging force of urging member 81 so that card 101 may be discharged.

Pin member 71 is urged downward from an upper side by plate spring 65, which is formed by bending a portion of shell 61 so as to be able to apply a pressing force toward bottom wall portion 11b. Pin member 71 is disposed between plate spring 65 and slide member 21 or housing 11 so as to be in a state where it is not separated from slide member 21 or housing 11.

In a portion of housing 11 at a side opposite to the card guide mechanism, a card detection switch is disposed, capable of detecting whether the contact pads of card 101 are in contact with terminals 51 and, thus, detecting that card 101 is fitted to card connector 1. The card detection switch is configured by first contact member 52 and second contact member 53, each of which is attached to first lateral wall portion 11c.

First contact member 52 includes attachment portion 52a attached to first lateral wall portion 11c, cantilever-like body portion 52b connected to attachment portion 52a at a proximal end thereof and extends toward inner wall portion 11a, loop-shaped projecting portion 52c connected to a free end of body portion 52b and extending toward inner wall portion 11a and obliquely toward second lateral wall portion 11d, and abutting portion 52d that is a free end of projecting portion 52c bent in a loop shape and extends in a direction away from inner wall portion 11a and obliquely toward first lateral wall portion 11c. Moreover, a curved convex portion of projecting portion 52c is projected further toward the deeper side of housing 11 than second lateral wall portion 11d, so as to contact lateral end 101b when card 101 is inserted.

Meanwhile, second contact member 53 includes attachment portion 53a attached to first lateral wall portion 11c, cantilever-like body portion 53b connected to attachment portion 53a at a proximal end thereof and extends toward inner wall portion 11a, and abutting portion 53c connected to a free end of body portion 53b and extending further outward toward inner wall portion 11a. Further, second contact member 53 is disposed separate from, and at an outer side further than, first contact member 52. For this reason, in a state where card 101 is not inserted, as illustrated in FIG. 4, first and second contact members 52, 53 are not in contact with each other. Thus, the card detection switch is in a non-conduction state; that is, in an "OFF" state.

When card 101 is inserted so as to reach a position where the contact pads and terminals 51 are in contact with each other, projecting portion 52c of first contact member 52 is pressed and moved toward the outer side by lateral end 101b, so that abutting portion 52d is brought into abutting contact with abutting portion 53c of second contact member 53. With this operation, first and second contact members 52, 53 are brought into contact with each other. Thus, the card detection switch is in a conduction state; that is, in an "ON" state.

Further, shell 61 has generally rectangular top plate portion 62, and plurality of lateral plate portions 64 erected from a plurality of locations of lateral edges of top plate portion 62. Each lateral plate portion 64 is provided with plurality of latching openings 63. As is understood from FIGS. 2-3, when shell 61 is attached to an upper side of housing 11, latching openings 63 are latched to latching projections 13, which are formed on outer surfaces of inner wall portion 11a and first and second lateral wall portions 11c, 11d. Thus, shell 61 is fixed to housing 11. Moreover, shell 61 includes plate spring 65, auxiliary urging member 82 and elastic member 83. Plate spring 65 is preferably formed by cutting and raising a portion of top plate portion 62.

Further, auxiliary urging member 82 is provided with attachment portion 82a erected from a lateral edge of top plate portion 62, cantilever-like body portion 82b connected to attachment portion 82a at a proximal end thereof, and distal end portion 82c that is a free end of body portion 82b. When shell 61 is attached to housing 11, auxiliary urging member 82 is accommodated in housing 11, so that, as illustrated in FIG. 4, auxiliary urging member 82 is positioned at a position above bottom wall portion 11b and in front of inner wall portion 11a in relation to the insertion direction of card 101.

More specifically, attachment portion 82a is disposed close to (and extends along) inner wall portion 11a. Body portion 82b extends in an oblique direction so that distal end portion 82c is directed toward first lateral wall portion 11c and toward the front side; i.e., away from inner wall portion 11a. Further, distal end portion 82c is positioned closer to first lateral wall portion 11c in relation to the width direction of housing 11, and moreover, is positioned closer to first lateral wall portion 11c than central axis C1 of front small-width portion 101c or central axis C2 of rear large-width portion 101d in relation to the width direction of card 101 that is inserted.

In a state where an external force is not applied to auxiliary urging member 82, distal end portion 82c is positioned at a front side further than inner wall portion 11a. When card 101 is moved further in the insertion direction (i.e., toward inner wall portion 11a), distal end portion 82c is pressed and moved in the insertion direction by front end 101a. With this operation, body portion 82b is elastically deformed. Thus, an urging force as a spring force is applied toward the front side; that is, in a counter-insertion direction.

In addition, concave receipt portion 11j—concaved toward the deeper side from a front side, is formed in inner wall portion 11a. Auxiliary urging member 82 is formed so as to be accommodated in concave receipt portion 11j. When card 101 is inserted, distal end portion 82c of auxiliary urging member 82 is brought into abutting contact with front end 101a of card 101, and is gradually moved toward the front side; that is, toward inner wall portion 11a with the insertion. When front end 101a of inserted card 101 is in abutting contact with the front edge of inner wall portion 11a, the insertion of card 101 is stopped. Since auxiliary urging member 82 is accommodated in concave receipt portion 11j in a state where card 101 reaches the termination point, body portion 82b is obliquely extended toward the front side; that is, in a direction away from inner wall portion 11a. In this regard, it is possible to prevent auxiliary urging member 82 from being excessively deformed so that body portion 82b is in parallel to inner wall portion 11a. That is, since auxiliary urging member 82 is deformed within an elastic region, the urging force can be maintained in a stable and continuous manner, and a miniaturization can be attained.

Elastic member 83 is provided with attachment portion 83a connected to a lateral edge of one lateral plate portion 64, body portion 83b connected to attachment portion 83a at a proximal end thereof and extends toward the center in the width direction of shell 61, curved projecting portion 83c connected to a free end of body portion 83b and bent in a loop shape, and distal end portion 83d (a free end of projecting portion 83c). When shell 61 is attached to housing 11, as illustrated in FIG. 4, elastic member 83 is positioned at a further front side than first lateral wall portion 11c and around insertion opening abutting portion 12 formed at a front side end of housing 11. More specifically, attachment portion 83a is positioned outside housing 11, body portion 83b is inserted toward an inner side of housing 11, a curved convex portion of projecting portion 83c is projected toward a further inner side of housing 11 than insertion opening abutting portion 12, and distal end portion 83d is accommodated in concave portion 12a.

When card 101 is inserted, lateral end 101b, close to first lateral wall portion 11c, is brought into abutting or close contact with projecting portion 83c. Upon discharging card 101, when card 101 is tilted by urging member 81 acting on lateral end 101b, close to second lateral wall portion 11d via slide member 21, projecting portion 83c is pressed and moved outward from housing 11 by lateral end 101b, close to first lateral wall portion 11c. Body portion 83b is elastically deformed, and an urging force is applied toward the inner side of housing 11.

Figure 5:
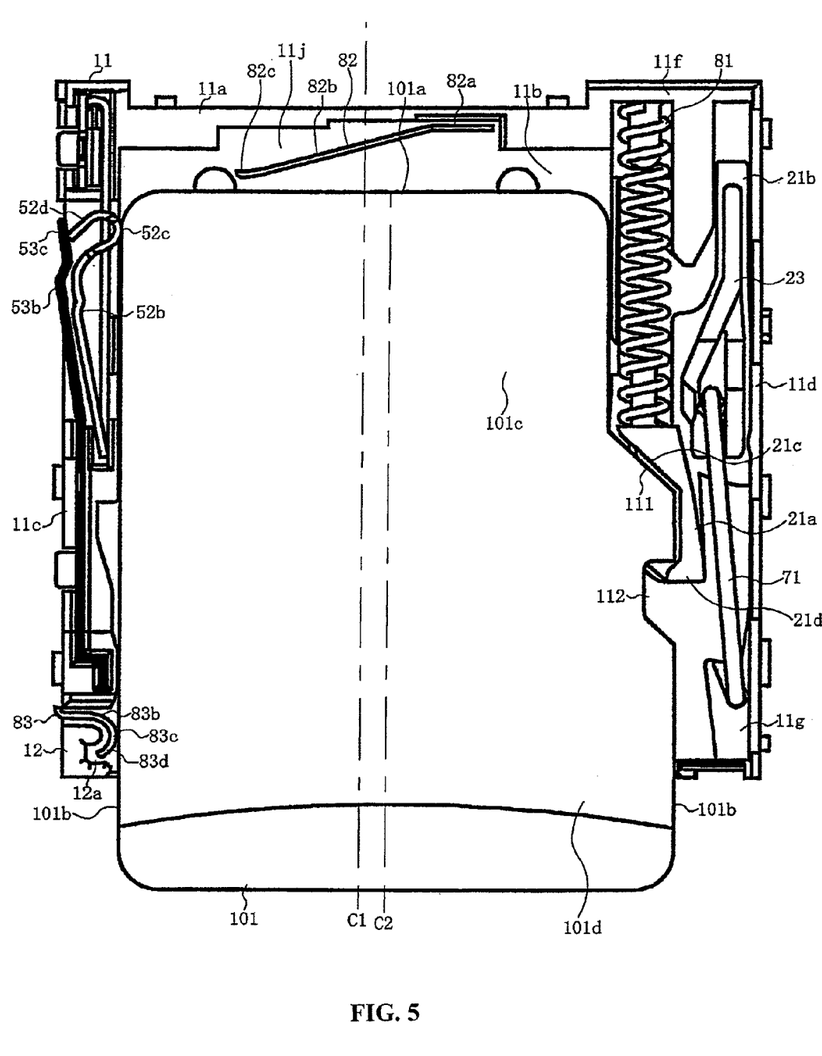
FIG. 5 is a plan view of the card connector according to an embodiment of the Present Invention, illustrating the state where the shell is removed when a card is at a lock position.
Figure 6:
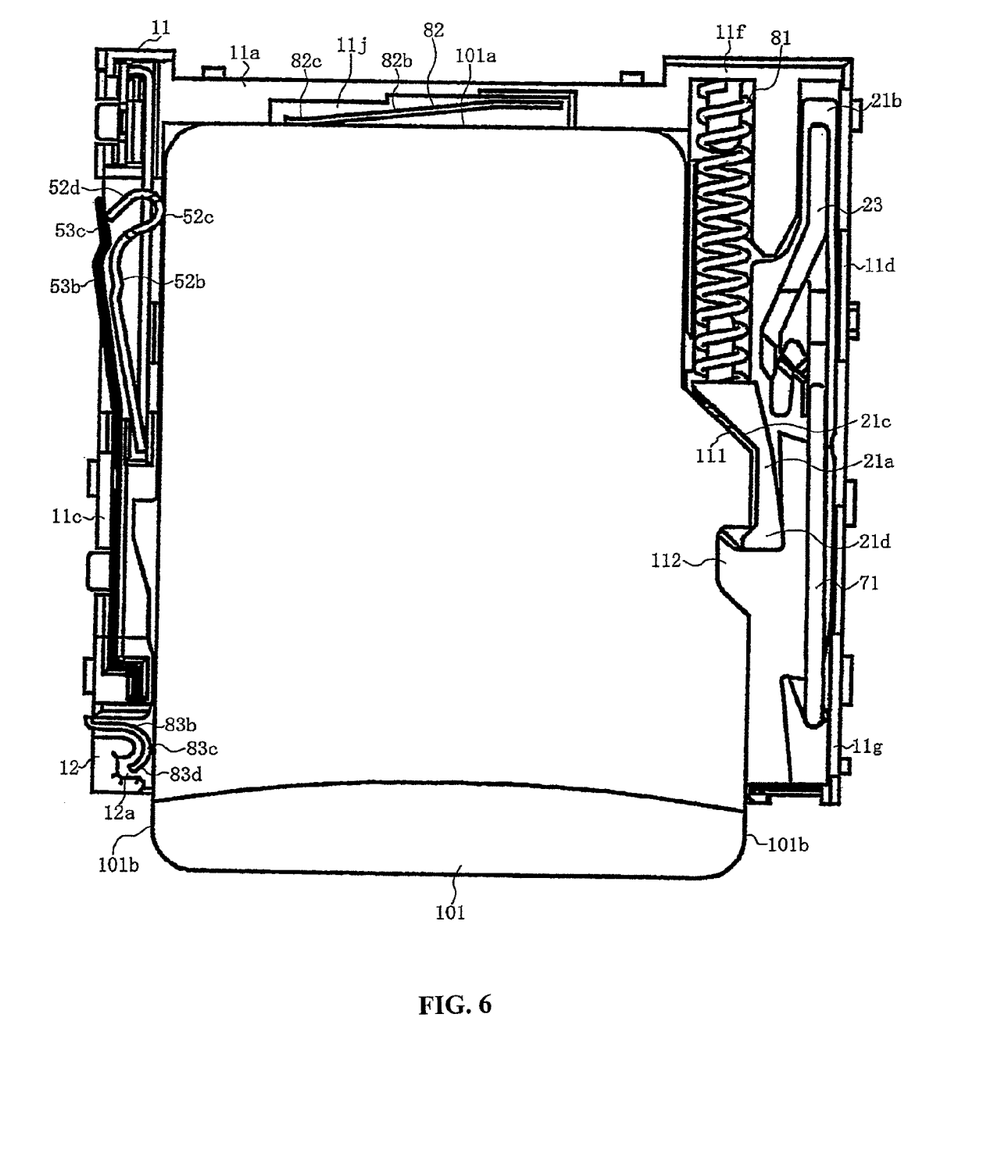
FIG. 6 is a plan view of the card connector according to an embodiment of the Present Invention, illustrating the state where the shell is removed when the card reaches a termination point.
Figure 7:
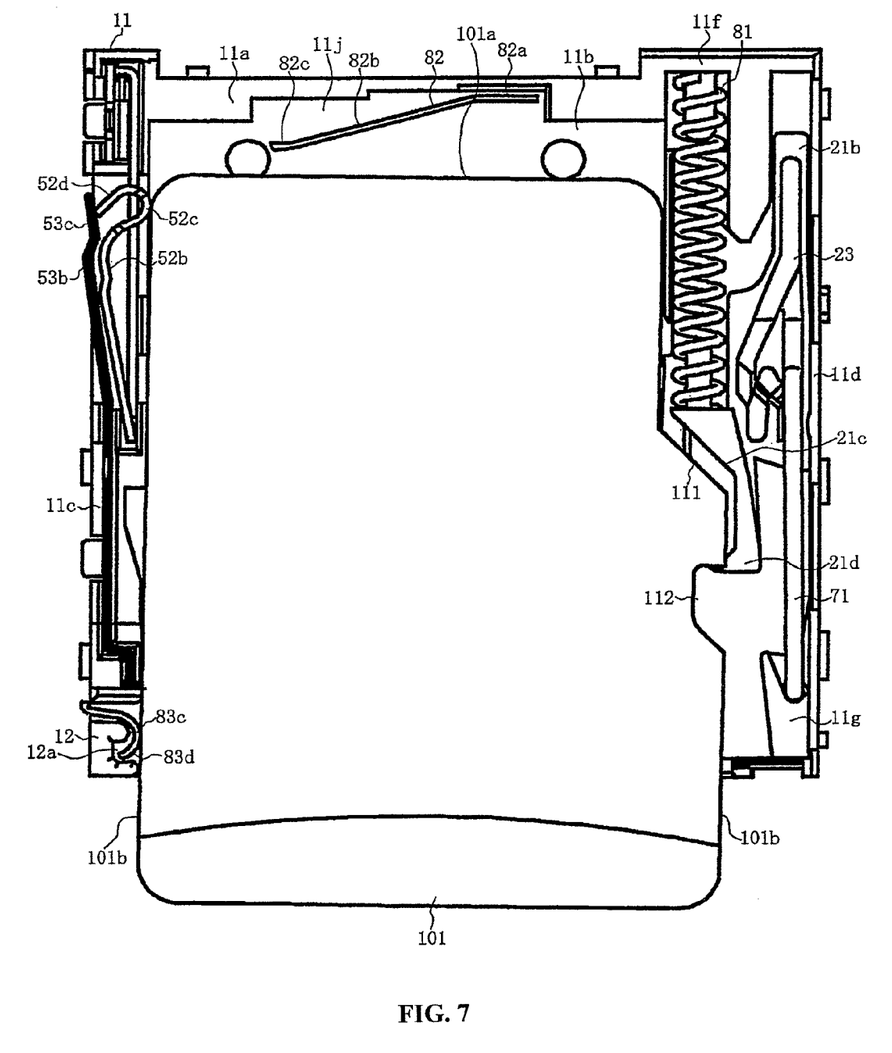
FIG. 7 is a plan view of the card connector according to an embodiment of the Present Invention, illustrating the state where the shell is removed when the card is being discharged by an urging force of an urging member.

Referring to FIGS. 5-7, a description of the operation of card connector 1 having the above-described structure will be provided. Preferably, a user inserts card 101 from the front side of card connector 1, wherein front end 101a is directed toward inner wall portion 11a. A surface having the contact pads formed thereon is opposed to bottom wall portion 11b and a surface without the contact pads formed thereon is opposed to top plate portion 62. That is, card 101 is inserted into housing 11 with one lateral end 101b being guided along first lateral wall portion 11c and one lateral end 101b being guided along second lateral wall portion 11d.

Subsequently, when the user pushes card 101 further toward the deeper side of housing 11, first and second engagement portion 21c, 21d are respectively engaged with engagement convex portion 111 and engagement concave portion 112, so that card 101 is moved toward inner wall portion 11a, together with slide member 21. At this time, the pressing force applied by the user is transmitted from engagement convex portion 111 via first engagement portion 21c to slide member 21. Then, since slide member 21 pressurizes urging member 81, slide member 21 and card 101 receive a repulsive force of urging member 81. However, the repulsive force is weaker than the pressing force of the user, and slide member 21 and card 101 are moved while resisting against the repulsive force. Thus, slide member 21 slides along second lateral wall portion 11d, and card 101 is inserted into the housing, together with slide member 21, with lateral end 101b being guided along first lateral wall portion 11c and lateral end 101b being guided along second lateral wall portion 11d. Further, slide member 21 and card 101 are in a full-stroke state when they reach the termination point which is the deepest insertion position.

Subsequently, when the user stops the pushing operation to release the application of the pressing force to card 101, slide member 21 and card 101 are moved in a direction away from inner wall portion 11*a* by urging member 81. Then, slide member 21 and card 101 are stopped at the lock position wherein card 101 is held at a locked state within card connector 1, as illustrated in FIG. 5. This is because the free end of pin member 71 being engaged with cam groove 23 formed on the upper surface of slide cam portion 21*b* is latched to a portion of cam groove 23 to stop the movement of slide member 21, so that slide member 21 is stopped at the lock position.

Moreover, since card 101 is held at the lock position, data can be transmitted and received between card 101 and the electronic device. Furthermore, when card 101 is held at the lock position, a plurality of contact pads of card 101 is in electrical contact with distal end portions 51*b*. In addition, projecting portion 52*c* of the card detection switch is pressed and moved outward by lateral end 101*b*, so that abutting portion 52*d* is brought into abutting contact with abutting portion 53*c*, as illustrated in FIG. 5. Thus, first and second contact members 52, 53 are brought into contact with each other. Thus, the card detection switch is in an "ON" state.

Meanwhile, front end 101*a* does not reach distal end portion 82*c*, as illustrated in FIG. 5. Therefore, auxiliary urging member 82 is in a state where an external force is not applied thereto. Thus, an urging force is exerted by auxiliary urging member 82. As will be understood from FIG. 5, auxiliary urging member 82 is positioned between front end 101*a* held at the lock position and inner wall portion 11*a*. Moreover, distal end portion 82*c* is positioned closer to first lateral wall portion 11*c* than central axis C1 or central axis C2 in relation to the width direction of card 101.

Furthermore, although lateral end 101*b* of card 101 close to first lateral wall portion 11*c* is in abutting or close contact with projecting portion 83*c* of elastic member 83, lateral end 101*b* is not pressed by projecting portion 83*c*. Therefore, elastic member 83 is also in a state where no force is applied thereto. Thus, an urging force is exerted by elastic member 83.

Referring to FIGS. 6-7, when the user pushes card 101, slide member 21 and card 101 are moved toward inner wall portion 11*a* from the lock position. Moreover, when the user pushes card 101 further toward the deeper side of housing 11, slide member 21 and card 101 are in a full-stroke state wherein they reach the termination point which is the deepest insertion position.

While card 101 is being moved from the lock position to the termination point, front end 101*a* of card 101 is brought into abutting contact with distal end portion 82*c* of auxiliary urging member 82. Moreover, distal end portion 82*c* is pressed and moved in the insertion direction; that is, toward inner wall portion 11*a*. When card 101 reaches the termination point, body portion 82*b* of auxiliary urging member 82 is elastically deformed, as illustrated in FIG. 6.

Moreover, as will be understood from FIG. 6, since projecting portion 52*c* of first contact portion 52 of the card detection switch is still pressed and moved outward by lateral end 101*b* of card 101 so that abutting portion 52*d* is in abutting contact with abutting portion 53*c* of second contact member 53, the card detection switch remains in the "ON" state. Furthermore, since lateral end 101*b* of card 101 close to first lateral wall portion 11*c* is still not pressed by projecting portion 83*c* of elastic member 83, elastic member 83 remains in a state where no force is applied.

Subsequently, when the user stops pushing card 101 to release the application of pressing force to card 101, slide member 21 and card 101 being positioned at the termination point are moved in a direction away from inner wall portion 11*a*; that is, in a direction opposite to the insertion direction by the urging force of urging member 81. Since the free end of pin member 71 being engaged with cam groove 23 of slide member 21 is not latched to a portion of cam groove 23 even when slide member 21 reaches the lock position, the movement of slide member 21 is not regulated and thus cannot be stopped at the lock position. For this reason, as illustrated in FIG. 7, slide member 21 and card 101 are passed through the lock position and moved further in a direction opposite to the insertion direction of card 101.

Meanwhile, when card 101 is positioned at the termination point, and since body portion 82*b* of auxiliary urging member 82 is elastically deformed, an urging force is exerted by auxiliary urging member 82. Therefore, while slide member 21 and card 101 are being moved from the termination point to the lock position, they receive the urging force of auxiliary urging member 82, in addition to the urging force of urging member 81. For this reason, in an initial stage of the discharging operation of card 101, a strong discharging force (that is, an urging force), is applied to slide member 21 and card 101. Thus, card 101 can be securely discharged without being stopped halfway the discharging operation. With this arrangement, even when the surface of card 101 makes frictional contact with the inner surface of housing 11 and/or shell 61 and, thus, a strong frictional force is applied to card 101, and since the urging force applied to slide member 21 and card 101 is stronger than the frictional force, card 101 can be moved in a direction opposite to the insertion direction and securely discharged.

Moreover, when card 101 is locked, since auxiliary urging member 82 does not exert the urging force, the urging force of auxiliary urging member 82 is applied to slide member 21 and card 101 only when both are at positions ranging from the termination point to the lock position. However, the static friction is preferably stronger than the dynamic friction. Therefore, as long as the movement is started with card 101 being applied with a discharging force stronger than the static frictional force at a time point when card 101 starts moving from the termination point, that is, at a time point when the discharging operation of card 101 is started, since the discharging force, though it may decrease thereafter, is stronger than the dynamic frictional force, the movement of slide member 21 and card 101 is not inhibited by the dynamic friction.

Further, even when the dynamic friction is high, and slide member 21 and card 101—that is moving in a direction opposite to the insertion direction of card 101—are passed through the lock position and stopped at a time point when the urging force of auxiliary urging member 82 disappears, as illustrated in FIGS. 5 and 7, and since the rear end of card 101 protrudes out from the front edge of housing 11, the user can easily eject card 101 by pulling card 101 out. Therefore, card 101 can be discharged without difficulties.

When the urging force applied to slide member 21 and card 101 is too strong, discharged card 101 may spring out from card connector 1. In such a case, card 101 may be lost. However, in this embodiment, since the urging force of auxiliary urging member 82 is exerted only when slide member 21 and card 101 are positioned at positions ranging from the termination point to the lock position and the urging force disappears when they are passed through the lock position, it is possible to prevent card 101 from spring out from card connector 1.

In addition, since the urging force of auxiliary urging member 82 is exerted only at positions ranging from the termination point to the lock power supply, the repulsive force applied to the user when card 101 is inserted into card connector 1 is not strong. Therefore, it is possible to prevent deterioration in operability when card 101 is inserted into card connector 1.

Meanwhile, slide member 21 moves along second lateral wall portion 11d with first and second engagement portions 21c, 21d being engaged with engagement convex portion 111 and engagement concave portion 112 formed on lateral end 101b. For this reason, the urging force of urging member 81 is applied to a portion in the vicinity of second lateral wall portion 11d. As a result, card 101 is rotated in the clockwise direction.

However, distal end portion 82c, which is a point at which the urging force of auxiliary urging member 82 is applied to card 101, is positioned closer to first lateral wall portion 11c than central axis C1 or central axis C2 in relation to the width direction of card 101. For this reason, the urging force of auxiliary urging member 82 is applied to a portion of front end 101a of card 101 in the vicinity of first lateral wall portion 11c. As a result, card 101 is rotated in the counter-clockwise direction in FIG. 6.

Therefore, the urging force of urging member 81 is diminished by the urging force of auxiliary urging member 82. With this mechanism, the pressing force of first lateral wall portion 11c applied to lateral end 101b decreases due to the urging force of urging member 81. Thus, the friction between lateral end 101b and first lateral wall portion 11c decreases. Accordingly, the movement of slide member 21 and card 101 is not inhibited by the friction between lateral end 101b and first lateral wall portion 11c.

Moreover, when card 101 is rotated and tilted in the clockwise direction by the urging force of urging member 81, as illustrated in FIG. 7, projecting portion 83c is pressed and moved outward in the width direction of housing 11 by a portion, close to the rear end, of lateral end 101b close to first lateral wall portion 11c. For this reason, body portion 83b is elastically deformed. Thus, elastic member 83 can exert an urging force in a direction toward the inner side in the width direction of housing 11. With this mechanism, the pressing force of first lateral wall portion 11c, applied to lateral end 101b, decreases due to the urging force of urging member 81. Thus, the friction between lateral end 101b of card 101 and first lateral wall portion 11c decreases. Accordingly, the movement of slide member 21 and card 101 is not inhibited by the friction between lateral end 101b and first lateral wall portion 11c.

Furthermore, when urging force of urging member 81 begins to be generated at a time when card 101 starts moving from the termination point (that is, at a time when the discharging operation of the card 101 is started), the portion, close to the rear end, of lateral end 101b close to first lateral wall portion 11c begins to move outward from housing 11. Thus, projecting portion 83c moves outward from housing 11. Then, projecting portion 83c is moved toward the inner side of housing 11 by the urging force of elastic member 83, so that the portion, close to the rear end, of lateral end 101b close to first lateral wall portion 11c is pressed toward the inner side of housing 11. With this mechanism, whole card 101 is moved in relation to housing 11, and lateral end 101b and elastic member 83 are in frictional contact. Therefore, the friction between the surface of card 101 and the inner surface of housing 11 and/or shell 61 changes from static friction to dynamic friction, and is thus decreased. Therefore, the movement of slide member 21 and card 101 is not inhibited by the friction. Card 101 thus starts moving from the termination point in a secure manner in a direction opposite to the insertion direction and is discharged.

Then, slide member 21 and card 101 (that is moving in a direction opposite to the insertion direction) are stopped when slide member 21 makes abutting contact with stopper portion 11g formed at the front end of second lateral wall portion 11d. Moreover, projecting portion 52c of the card detection switch returns to its original position by the restoring properties of body portion 52b. For this reason, first and second contact members 52, 53 are not in contact with each other. Thus, the card detection switch is in an "OFF" state.

In this embodiment, a strong urging force can be applied to card 101 in an initial stage of the operation of discharging card 101. Thus, it is possible to securely discharge card 101 without being stopped halfway the discharging operation. Consequently, it is possible to reduce the manufacturing cost of card connector 1 and to decrease the size of card connector 1 without complicating the structure of card connector 1. Moreover, card connector 1, according to this embodiment, further includes shell 61 attached to housing 11 so as to cover at least a portion of an upper portion of housing 11 and card 101 accommodated in housing 11, and auxiliary urging member 82 is attached to shell 61. With this arrangement, it is possible to simplify the structure of housing 11. Furthermore, auxiliary urging member 82 does not exert the urging force when card 101 is in a lock position. With this arrangement, the repulsive force applied to the user when card 101 is inserted into card connector 1 is not strong. Therefore, it is possible to prevent any deterioration in the operability when card 101 is inserted into card connector 1.

Furthermore, the card guide mechanism engages with one lateral end 101b to move card 101, and auxiliary urging member 82 applies the urging force to a portion in the vicinity of lateral end 101b. With this arrangement, the urging force of urging member 81 is diminished by the urging force of auxiliary urging member 82. With this mechanism, the pressing force of first lateral wall portion 11c applied to lateral end 101b decreases due to the urging force of urging member 81. Thus, the friction between lateral end 101b and first lateral wall portion 11c decreases. Accordingly, the movement of slide member 21 and card 101 is not inhibited by the friction between lateral end 101b and first lateral wall portion 11c.

Furthermore, card connector 1 further includes elastic member 83 disposed at an end at the front side in the insertion direction of housing 11 so as to elastically deform while making abutting contact with lateral end 101b. With this arrangement, the friction between the surface of card 101 and the inner surface of housing 11 and/or shell 61 changes from the static friction to the dynamic friction and is thus decreased. Therefore, the movement of slide member 21 and card 101 is not inhibited by the friction, and card 101 starts moving from the termination point in a secure manner in a direction opposite to the insertion direction and is discharged.

Furthermore, elastic member 83 is attached to shell 61. Thus, it is possible to simplify the structure of housing 11. In addition, elastic member 83 urges card 101 in a backward direction when it is moved toward a lateral side of housing 11 by lateral end 101b. With this arrangement, the pressing force of first lateral wall portion 11c applied to lateral end 101b decreases due to the urging force of urging member 81. Thus, friction between lateral end 101b and first lateral wall portion 11c decreases. Accordingly, the movement of slide member 21 and card 101 is not inhibited by friction between lateral end 101b and first lateral wall portion 11c.

While a preferred embodiment of the Present Invention is shown and described, it is envisioned that those skilled in the art may devise various modifications without departing from the spirit and scope of the foregoing Description and the appended Claims.

What is claimed is:

1. A card connector, the card connector comprising:
a housing, the housing being provided with connection terminals connected to a card housed therein;
a cover member, the cover member being attached to the housing to cover at least a portion of an upper portion of the housing and the card housed therein;
an auxiliary urging member, the auxiliary urging member being capable of urging the card in a direction opposite an insertion direction of the card, the auxiliary urging member being attached to the cover member; and
a card guide mechanism, the card guide mechanism being provided with an urging member, the urging member being capable of urging the card in the direction opposite the insertion direction of the card;
wherein the urging member and the auxiliary urging member are configured to cooperate with each other to move the card.

2. The card connector according to claim 1, wherein:
the card guide mechanism is configured to engage one lateral end of the card to move the card;
the auxiliary urging member applies the urging force to a portion in the vicinity of the other lateral end of the card;
the housing is further provided with a bottom wall portion and an inner wall portion that upstands at an end at an inner side of the bottom wall portion; and
the inner wall portion is provided with a concave receipt portion in which the auxiliary urging member is received.

3. The card connector according to claim 1, wherein the card guide mechanism holds the card, the card being provided with terminal members, at a lock position to maintain a state where the terminal members contact the connection terminals of the housing.

4. The card connector according to claim 2, wherein the auxiliary urging member is configured to exert no urging force when the card is at the lock position thereof.

5. The card connector according to claim 2, wherein the card guide mechanism moves the card in the direction opposite to the insertion direction when the card reaches a terminal point, due to a pushing operation for pushing the card held at the lock position to be moved in the insertion direction, from the terminal point by an urging force of the urging member so that the card is discharged.

6. The card connector according to claim 3, wherein the auxiliary urging member is disposed at a position located further toward the inner side in the insertion direction than the card held at the lock position, to urge the card in the direction opposite the insertion direction during movement of the card in a region spanning from the terminal point to the lock position thereof.

7. The card connector according to claim 6, wherein the auxiliary urging member is configured to exert no urging force when the card is at the lock position thereof.

8. The card connector according to claim 7, wherein the card guide mechanism is configured to engage one lateral end of the card to move the card.

9. The card connector according to claim 8, wherein the auxiliary urging member applies the urging force to a portion in the vicinity of the other lateral end of the card.

10. The card connector according to claim 9, wherein the housing is further provided with a bottom wall portion and an inner wall portion that upstands at an end at an inner side of the bottom wall portion.

11. The card connector according to claim 10, wherein the inner wall portion is provided with a concave receipt portion in which the auxiliary urging member is received.

12. The card connector according to claim 11, further comprising a card detection switch, the card detection switch being capable of detecting that the terminal members of the card are in contact with the connection terminals.

13. The card connector according to claim 12, wherein the card detection switch is provided with a first contact member that is moved while making a tight contact with the other lateral end of the card.

14. The card connector according to claim 13, wherein the card detection switch is provided with a second contact member brought into electrical contact with the first contact member.

15. The card connector according to claim 1, wherein the housing is further provided with a bottom wall portion and an inner wall portion that upstands at an end at an inner side of the bottom wall portion.

16. The card connector according to claim 15, wherein the inner wall portion is provided with a concave receipt portion in which the auxiliary urging member is received.

17. A card connector, comprising:
a housing in which a card provided with terminal members is accommodated;
connection terminals attached to the housing and capable of coming into contact with the terminal members; and
a card guide mechanism provided with an urging member, the card guide mechanism being capable of urging the card in a direction opposite an insertion direction, the card guide mechanism being configured to engage one lateral end of the card to hold the card at a lock position to maintain a state where the terminal members of the card are in contact with the connection terminals, and to move the card in a direction opposite the insertion direction when the card reaches a terminal point, due to a push operation for pushing the card held at the lock position to be moved in the insertion direction, from the terminal point by an urging force of the urging member so that the card is discharged;
wherein the card connector further comprises:
an auxiliary urging member disposed at a position located further toward the inner side in the insertion direction than the card held at the lock position to urge the card in the direction opposite the insertion direction during a movement of the card in a region spanning from the terminal point to the lock position thereof; and
an elastic member disposed at an end of the front side in the insertion direction of the housing to elastically deform while making a tight contact with the other lateral end of the card.

18. The card connector according to claim 17, further comprising a cover member attached to the housing to cover at least a portion of an upper portion of the housing and the card housed therein.

19. The card connector according to claim 18, wherein the auxiliary urging member and the elastic member are attached to the cover member.

20. The card connector according to claim 19, wherein the elastic member urges the card in a backward direction when it is moved toward a lateral side of the housing by the other lateral end of the card.

* * * * *